United States Patent
Huang-Fu et al.

(10) Patent No.: US 11,039,369 B2
(45) Date of Patent: Jun. 15, 2021

(54) HANDLING 5G QOS RULES ON QOS OPERATION ERRORS

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 16/525,852

(22) Filed: Jul. 30, 2019

(65) Prior Publication Data

US 2020/0053010 A1 Feb. 13, 2020

Related U.S. Application Data

(60) Provisional application No. 62/717,352, filed on Aug. 10, 2018.

(51) Int. Cl.
*H04L 12/813* (2013.01)
*H04W 28/04* (2009.01)
(Continued)

(52) U.S. Cl.
CPC .......... *H04W 40/02* (2013.01); *H04L 45/306* (2013.01); *H04L 47/20* (2013.01);
(Continued)

(58) Field of Classification Search
CPC ..... H04W 40/02; H04W 76/27; H04W 8/183; H04W 28/0215; H04W 28/0252;
(Continued)

(56) References Cited

U.S. PATENT DOCUMENTS

2004/0109466 A1  6/2004 Van Ackere et al. .......... 370/419
2005/0080754 A1  4/2005 Kashlwabara et al.
(Continued)

FOREIGN PATENT DOCUMENTS

CN   101895966 A   11/2010
CN   102724736 A   10/2012
(Continued)

OTHER PUBLICATIONS

3GPP TSG-CT WG1 Meeting #111, Source: Ericsson, Mediatek Inc., Qualcomm Incorporated. (Year: 2018).*
(Continued)

*Primary Examiner* — Candal Elpenord
(74) *Attorney, Agent, or Firm* — Imperium Patent Works; Zheng Jin (57) ABSTRACT

A method at enhanced error handling for 5G QoS operations is proposed. A PDU session defines the association between the UE and the data network that provides a PDU connectivity service. Each PDU session is identified by a PDU session ID, and may include multiple QoS flows and QoS rules. Within a PDU session, there should be one and only one default QoS rule. The default QoS rule indication (DQR) and the QoS flow identifier (QFI) of QoS rule should not be changed. When the QoS operation carried by the command message is "Modify existing QoS rule and delete packet filters", then it is defined as a semantic error in the QoS operation if all the packet filters of a QoS rule are deleted, and the QoS rule is a QoS rule of a PDU session of IPv4, IPv6, IPv4v6, or Ethernet PDU session type.

20 Claims, 4 Drawing Sheets (51) Int. Cl.
| | | |
|---|---|---|
| *H04W 28/02* | (2009.01) | |
| *H04W 40/02* | (2009.01) | |
| *H04W 48/12* | (2009.01) | |
| *H04L 29/06* | (2006.01) | |
| *H04L 12/725* | (2013.01) | |
| *H04W 28/12* | (2009.01) | |
| *H04W 36/00* | (2009.01) | |
| *H04W 36/14* | (2009.01) | |
| *H04W 68/02* | (2009.01) | |
| *H04W 76/27* | (2018.01) | |
| *H04L 29/08* | (2006.01) | |
| *H04W 8/18* | (2009.01) | |
| *H04W 36/08* | (2009.01) | |
| *H04W 48/18* | (2009.01) | |
| *H04W 84/04* | (2009.01) | |

(52) U.S. Cl.
CPC ........ *H04L 65/1003* (2013.01); *H04L 67/141* (2013.01); *H04L 67/146* (2013.01); *H04L 67/148* (2013.01); *H04W 8/183* (2013.01); *H04W 28/0215* (2013.01); *H04W 28/0252* (2013.01); *H04W 28/0268* (2013.01); *H04W 28/04* (2013.01); *H04W 28/12* (2013.01); *H04W 36/0022* (2013.01); *H04W 36/08* (2013.01); *H04W 36/14* (2013.01); *H04W 48/12* (2013.01); *H04W 48/18* (2013.01); *H04W 68/02* (2013.01); *H04W 76/27* (2018.02); *H04W 84/042* (2013.01)

(58) Field of Classification Search
CPC . H04W 28/0268; H04W 28/04; H04W 28/12; H04W 36/0022; H04W 36/08; H04W 36/14; H04W 48/18; H04W 68/02; H04L 45/306; H04L 47/20; H04L 65/1003; H04L 67/141; H04L 67/146; H04L 67/148
See application file for complete search history.

(56) References Cited

U.S. PATENT DOCUMENTS

| | | | |
|---|---|---|---|
| 2008/0195511 A1 | 8/2008 | Zhang | 705/30 |
| 2010/0217855 A1 | 8/2010 | Przybysz et al. | 709/223 |
| 2012/0147767 A1 | 6/2012 | Yang et al. | 370/252 |
| 2012/0196566 A1 | 8/2012 | Lee et al. | 455/408 |
| 2013/0044592 A1 | 2/2013 | Kim et al. | 370/229 |
| 2014/0112150 A1 | 4/2014 | Ko et al. | 370/236 |
| 2016/0119773 A1 | 4/2016 | Xu et al. | 455/432.2 |
| 2017/0006494 A1 | 1/2017 | Wang et al. | 370/236 |
| 2017/0289046 A1 | 10/2017 | Faccin et al. | |
| 2017/0339609 A1 | 11/2017 | Youn et al. | |
| 2018/0048537 A1* | 2/2018 | Gaikwad | H04L 41/0896 |
| 2018/0049218 A1 | 2/2018 | Hapsari et al. | |
| 2018/0070276 A1 | 3/2018 | Wu | |
| 2018/0070288 A1 | 3/2018 | Kim et al. | |
| 2018/0198867 A1* | 7/2018 | Dao | H04W 76/30 |
| 2018/0220290 A1 | 8/2018 | Sivavakeesar | |
| 2018/0234876 A1 | 8/2018 | Jheng et al. | |
| 2018/0270695 A1 | 9/2018 | Bergstrom et al. | |
| 2018/0376445 A1 | 12/2018 | Yoon et al. | |
| 2019/0116518 A1* | 4/2019 | Stojanovski | H04L 67/146 |
| 2019/0159059 A1 | 5/2019 | Jheng et al. | |
| 2019/0166647 A1 | 5/2019 | Velev et al. | |
| 2019/0174573 A1 | 6/2019 | Velev et al. | |
| 2019/0200264 A1 | 6/2019 | Kim et al. | |
| 2019/0223060 A1 | 7/2019 | Zhou et al. | |
| 2019/0239280 A1 | 8/2019 | Li et al. | |
| 2019/0253870 A1 | 8/2019 | Ronneke et al. | |
| 2019/0253917 A1* | 8/2019 | Dao | H04W 4/24 |
| 2019/0254118 A1 | 8/2019 | Dao et al. | |
| 2019/0261211 A1 | 8/2019 | Wu et al. | |
| 2019/0289506 A1 | 9/2019 | Park et al. | |
| 2019/0349803 A1 | 11/2019 | Byun et al. | |
| 2019/0357118 A1 | 11/2019 | Kim et al. | |
| 2019/0357129 A1 | 11/2019 | Park et al. | |
| 2019/0394830 A1* | 12/2019 | Mildh | H04W 52/0258 |
| 2020/0037197 A1 | 1/2020 | Cho et al. | |
| 2020/0037386 A1* | 1/2020 | Park | H04L 29/06 |
| 2020/0077315 A1* | 3/2020 | Jin | H04W 36/00 |
| 2020/0100147 A1 | 3/2020 | Youn et al. | |
| 2020/0145884 A1* | 5/2020 | Guo | H04L 12/1407 |
| 2020/0187043 A1* | 6/2020 | Xin | H04M 15/66 |
| 2020/0260336 A1* | 8/2020 | Wu | H04W 36/0022 |
| 2020/0275302 A1 | 8/2020 | Youn et al. | H04W 28/02 |
| 2020/0280562 A1 | 9/2020 | Salkintzis | |
| 2020/0374352 A1* | 11/2020 | Ge | H04W 36/38 |
| 2021/0014157 A1* | 1/2021 | Zhou | H04L 45/302 |
| 2021/0022099 A1* | 1/2021 | Kumar | H04W 68/005 |

FOREIGN PATENT DOCUMENTS

| | | |
|---|---|---|
| CN | 103517325 A | 1/2014 |
| CN | 106332187 A | 1/2017 |
| CN | 107018542 A | 8/2017 |
| CN | 107580371 A | 1/2018 |
| CN | 107592331 A | 1/2018 |
| CN | 107690161 A | 2/2018 |
| CN | 107925862 A | 4/2018 |
| CN | 108307449 A | 7/2018 |
| EP | 3557905 A1 | 10/2019 |
| WO | WO2014114525 A1 | 7/2014 |
| WO | WO2018034337 A1 | 2/2018 |
| WO | WO2018059689 A1 | 4/2018 |
| WO | WO2018065060 A1 | 4/2018 |
| WO | WO2018070436 A1 | 4/2018 |
| WO | WO2018111029 A1 | 6/2018 |

OTHER PUBLICATIONS

International Search Report and Written Opinion of International Search Authority for PCT/CN2019/081864 dated Jul. 1, 2019 (9 pages).
3GPP TR 24.890 V15.1.0 (Mar. 2018), 3rd Generation Partnership Project; Technical Specification Group Core Network and Terminals; 5G System—Phase 1; CT WG1 Aspects, (Release 15) *section 9.5.6, sections 12.4*.
S2-175526 SA WG2 Meeting #122 Bis, Samsung, "update on PDU session handling for AS and NAS QoS", Sophia Antipolis, France, Aug. 21-25, 2017 (11 pages).
S2-177432 SA WG2 Meeting #S2-123, Samsung, "TS 23.501: PDU session reachability management", Ljubljana, Slovenia, Oct. 23-27, 2017 (7 pages).
International Search Report and Written Opinion of International Search Authority for PCT/CN2019/081866 dated Jun. 27, 2019 (9 pages).
3GPP TS 24.501 V0.2.2 (Dec. 2017), 3rd Generation Partnership Project; Technical Specification Group Core Network and Terminals; Non-Access-Stratum (NAS) protocol for 5G System (5GS); State 3 (Release 15) *sections 6.2.5, sections 8.3*.
Taiwan IPO, office action for related TW patent application 108110866 (no English translation is available) dated Mar. 23, 2020 (10 pages).
3GPP TR 24.890, "3rd Generation Partnership Project; Technical Specification Group Core Network and Terminals;; 5G System—Phase 1; CT WG1 Aspects (Release 15)," V15.1.0, Mar. 2018 *sections 9.5.3.2, 9.5.5.2, 9.5.6.2, 9.5.6.4, 12.4.1.1.2, Fig. 9.5.5.2.1, Fig. 9.5.6.2.1*.
3GPP SS WG2 Meeting #124 (S2-178255), Nokia et al., "OI#18 23.502;" (NAS SM; split)+Correcting information flows in § 4. (PDU session related), Reno, NV. USA, Nov. 27-Dec. 1, 2017 *sections 4.3.3.2, Fig. 4.3.3.2-1*.
3GPP TS 23.502, "3rd Generation Partnership Project; Technical Specification Group Services and System Aspects; Procedures for the 5G System; Stage 2 (Release 15)", V15.1.0, Sep. 2018 *section 4.3.3.2*.

(56) References Cited

OTHER PUBLICATIONS

International Search Report and Written Opinion of International Search Authority for PCT/CN2019/100199 dated Oct. 30, 2019 (8 pages).
3GPP TS 23.502 V15.2.0 (Jun. 2018), 3rd Generation Partnership Project; Technical Specification Group Services and System Aspects; Procedures for the 5G System; Stage 2 (Release 15) *pp. 55-63, 125-128*.
C1-173057 3GPP TSG-CT WG1 Meeting #105, Huawei et al., "5GSM message for PDU session anchor relocation for SSC mode 2 and SSC mode 3", Krakow, Poland, Aug. 21-25, 2017 (5 pages).
International Search Report and Written Opinion of International Search Authority for PCT/CN2019/100218 dated Nov. 4, 2019 (9 pages).
International Search Report and Written Opinion of International Search Authority for PCT/CN2019/099889 dated Oct. 31, 2019 (9 pages).
3GPP TS 24.501 v15.0.0 (Jun. 2018), 3rd Generation Partnership Project; Technical Specification Group Core Network and Terminals; Non-Access-Stratum (NAS) protocol for 5G System (5GS); Stage 3 (Release 15) *clause 6.1 to 6.2.3*.
International Search Report and Written Opinion of International Search Authority for PCT/CN2019/099719 dated Oct. 31, 2019 (9 pages).
C1-184425 3GPP TSG-CT WG1 Meeting #111 bis, MediaTek Inc., "Exception handling in QoS operation", Sophia-Antipolis, France, Jul. 9-13, 2018 (8 pages).
C1-184614 3GPP TSG CT WG1 Meeting #111 bis, MediaTek Inc., "Exception handling in QoS operation", Sophia-Antipolis, France, Jul. 9-13, 2018 (7 pages).
USPTO, office action for the related U.S. Appl. No. 16/366,125 dated Apr. 2, 2020 (16 pages).
3GPP TS 24.501 V0.2.2 (Dec. 2017), 3rd Generation Partnership Project; Technical Specification Group Core Network and Terminals; Non-Access-Stratum (NAS) protocol for 5G System (5GS); State 3 (Release 15) *p. 2, 84-88, and 128-138*.
International Search Report and Written Opinion of International Search Authority for PCT/CN2019/094339 dated Sep. 27, 2019 (10 pages).
C1-184614 3GPP TSG-CT WG1 Meeting #11 bis, MediaTek Inc., "Exception handling in QoS operation", Sophia-Antipolis, France, Jul. 9-13, 2018 (7 pages) *sections 6.3.2.4*.
C1-182457 3GPP TSG-CT WG1 Meeting #110, Huawei et al., "Encoding of Match All Packet Filter", Kunming, P.R. of China, Apr. 16-20, 2018 (12 pages) *sections 6.2.5.1.1*, *sections 9.8.4. 7*.
Taiwan IPO, office action for the TW patent application 108110864 (no English translation is available) dated Jun. 22, 2020 (9 pages).
3GPP TS 24.501 V1.0.0 (Mar. 2018) 3rd Generation Partnership project; Technical Specification Group Core Network and Terminals; Non-Access-Stratum(NAS) protocol for 5G System (5GS); Stage 3 (Release 15), *section 5.4.4.3, 6.2.3, 6.2.5.1.1.2, 6.4.1.1, 6.4.1.2, 6.4.1.3, 6.4.3.2*.
S2-180421 SA WG2 Meeting #S2-125, Ericsson, "Default QoS Rule discussion", Gothenburg, Sweden, Jan. 22-26, 2018 (4 pages) *section 1, 2.1*.
Taiwan IPO, office action for the TW patent application 108127877 (no English translation is available) dated May 8, 2020 (6 pages).
C1-184425 3GPP TSG-CT WG1 Meeting #111 bis, MediaTek Inc., "Exception handling in QoS operation", Sophia-Antipolis, France, Jul. 9-13, 2018 (8 pages) *pages 1-5*.
International Search Report and Written Opinion of International Search Authority for PCT/CN2019/099905 dated Nov. 19, 2019 (10 pages).
C1-173817 3GPP TSG-CT WG1 Meeting #106, Ericsson et al, "5G QoS-errors in QoS rules IE", Kochi, India, Oct. 23-27, 2017 (19 pages) *sections 9, 12*.
R3-171125 3GPP TSG-RAN WG2 #95bis, Nokia et al., "PDU Session Modification Procedure", Spokane, USA, Apr. 3-7, 2017 (3 pages).
International Search Report and Written Opinion of International Search Authority for PCT/CN2019/100200 dated Nov. 14, 2019 (9 pages).
3GPP TS 23.503 V1.0.0 (Dec. 2012), 3rd Generation Partnership Project; Technical Specification Group Services and System Aspects; Policy and Charging Control Framework for the 5G System; Stage 2 (Release 15) *see 4.2.2 and 6.1.2*.
USPTO, office action for related U.S. Appl. No. 16/535,691 dated Feb. 4, 2020 (12 pages).
USPTO, office action for related U.S. Appl. No. 16/366,106 dated Sep. 16, 2020 (13 pages).
U.S. Appl. No. 16/366,106 OA reference S2-173269 SA WG2 Meeting #S2-121, Samsung, "TS 23.502—Update General Registration", Hangzhou, China, May 15-19, 2017 (6 pages).
USPTO, office action for related U.S. Appl. No. 16/366,125 dated Oct. 19, 2020 (18 pages).
USPTO, notice of allowance for related U.S. Appl. No. 16/458,523 dated Feb. 4, 2021 (14 pages).
C1-185828 3GPP TSG-CT WG1 Meeting #112, Qualcomm Incorporated et al., "PDU Session Release due to Semantic or Syntactical Errors", West Palm Beach, FL, USA dated Aug. 20-24, 2018 (10 pages).
3GPP TS 24.501 V15.1.0 (Sep. 2018) 3rd Generation Partnership project; Technical Specification Group Core Network and Terminals; Non-Access-Stratum (NAS) protocol for 5G System (5GS); Stage 3 (Release 15).
3GPP TS 23.501 V1.0.0 (Jun. 2017), 3rd Generation Partnership Project; Technical Specification Group Services and System Aspects; System Architecture for the 5G System; Stage 2 (Release 15).

* cited by examiner

HANDLING 5G QOS RULES ON QOS OPERATION ERRORS

CROSS REFERENCE TO RELATED APPLICATIONS

This application claims priority under 35 U.S.C. § 119 from U.S. Provisional Application No. 62/717,352, entitled "Performance Enhancement in 5G System", filed on Aug. 10, 2018, the subject matter of which is incorporated herein by reference.

TECHNICAL FIELD

The disclosed embodiments relate generally to wireless communication, and, more particularly, to method of handling Quality of Service (QoS) operation errors in 5G new radio (NR) systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. With the optimization of the network design, many improvements have developed over the evolution of various standards. The Next Generation Mobile Network (NGMN) board, has decided to focus the future NGMN activities on defining the end-to-end requirements for 5G new radio (NR) systems.

Quality of Service (QoS) indicates the performance from the perspective of network users. In LTE Evolved Packet System (EPS), QoS is managed based on EPS bearer in the Evolved Packet Core (EPC) and the Radio Access Network (RAN). In 5G network, QoS flow is the finest granularity for QoS management to enable more flexible QoS control. The concept of QoS flow is like EPS bearer. All types of traffic mapped to the same LTE EPS bearer or to the same 5G QoS flow receive the same level or packet forwarding treatment (e.g., scheduling policy, queue management policy, rate shaping policy, RLC configuration etc.) Providing different QoS forwarding treatment requires separate 5G QoS flow. Each QoS flow may include multiple QoS rules consisting of QoS profile, packet filters, and precedence order. QoS profile includes QoS parameters and QoS marking. Packet filter is used for binding a QoS flow to a specific QoS marking. Precedence order represents the priority to adapt a QoS rule to a QoS flow. UE performs the classification and marking of uplink (UL) User Plane traffic, i.e., the association of UL traffic to QoS flows based on QoS rules.

In 5G, PDU session establishment is a parallel procedure of PDN connection procedure in 4G. A PDU session defines the association between the UE and the data network that provides a PDU connectivity service. Each PDU session is identified by a PDU session ID, and may include multiple QoS flows and QoS rules. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow. Within a PDU session, there should be one and only one default QoS rule. For additional details of the default QoS rule, please refer to patent application Ser. No. 16/366,106 filed on Mar. 27, 2019, and patent application Ser. No. 16/366,125 filed on Mar. 27, 2019, the subject of which is incorporated by reference.

In the current 5G non-access stratum (NAS) specification, based on QoS rule operation codes defined in the QoS rule IE, the allowed operation include: 1) create new QoS rule; 2) delete existing QoS rule; 3) modify existing QoS rule and add packet filters; 4) modify existing QoS rule and replace packet filters; 5) modify existing QoS rules and delete packet filters; and 6) modify existing QoS rule without modifying packet filters. According to the current specification, the packet filter (PF) set of the default QoS rule cannot be empty. However, it is not defined whether the non-default QoS rule can have empty PF set. The UE behavior on deleting all the PFs within a QoS rule is not defined. The UE behavior on deleting all the PFs within a default QoS rule is not defined. It is thus desirable to define the UE behavior and error handling for proper QoS rule management under different QoS operations.

SUMMARY

A method of enhanced error handling for 5G QoS operations is proposed. A PDU session defines the association between the UE and the data network that provides a PDU connectivity service. Each PDU session is identified by a PDU session ID, and may include multiple QoS flows and QoS rules. Within a PDU session, there should be one and only one default QoS rule. The default QoS rule indication (DQR) and the QoS flow identifier (QFI) of a signaled QoS rule should not be changed. When the QoS operation carried by the command message is "Modify existing QoS rule and delete packet filters", then it is defined as a semantic error in the QoS operation if all the packet filters of a QoS rule are deleted, and the QoS rule is a QoS rule of a PDU session of IPv4, IPv6, IPv4v6, or Ethernet PDU session type.

In one embodiment, a UE receives Quality of Service (QoS) rule configuration in a mobile communication network for performing a QoS operation on a QoS rule associated with a protocol data unit (PDU) session. The UE determines that a set of packet filters for the QoS rule will be empty after the QoS operation, and the PDU session type is IPv4, IPv6, IPv4v6, or Ethernet. The UE detects whether the QoS rule is a default QoS rule of the PDU session. If a detecting result is negative, then the UE deletes the QoS rule when the QoS operation is processed successfully. If the detecting result is positive, then the UE releases the PDU session. In one embodiment, the UE receives the QoS rule configuration via a PDU session modification command message during a PDU session modification procedure. In another embodiment, the UE receives the QoS rule configuration via a modify EPS bearer context request message during an EPS session management (ESM) procedure.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
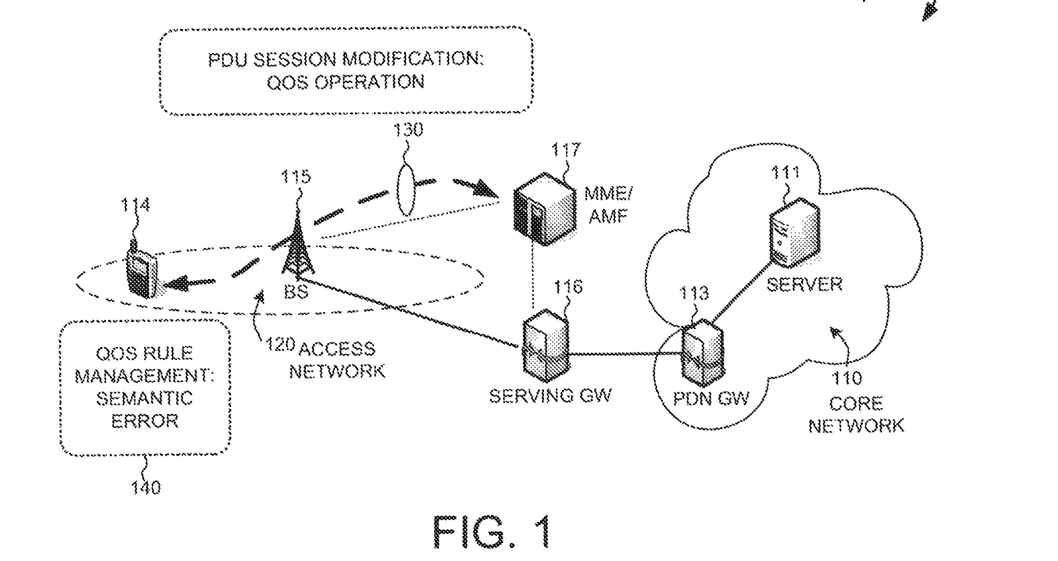
FIG. 1 illustrates an exemplary EPS/5GS network supporting Quality of Service (QoS) rule management in accordance with one novel aspect.

FIG. 1 illustrates an exemplary 4G LTE or 5G new radio (NR) 100 network supporting Quality of Service (QoS) rule management in accordance with one novel aspect. LTE/NR network 100 comprises application server 111 that provides various services by communicating with a plurality of user equipments (UEs) including UE 114. In the example of FIG. 1, application server 111 and a packet data network gateway (PDN GW or P-GW) 113 belong to part of a core network CN 110. UE 114 and its serving base station BS 115 belong to part of a radio access network RAN 120. RAN 120 provides radio access for UE 114 via a radio access technology (RAT). Application server 111 communicates with UE 114 through PDN GW 113, serving GW 116, and BS 115. A mobility management entity (MME) or an access and mobility management function (AMF) 117 communicates with BS 115, serving GW 116 and PDN GW 113 for access and mobility management of wireless access devices in LTE/NR network 100. UE 114 may be equipped with a radio frequency (RF) transceiver or multiple RF transceivers for different application services via different RATs/CNs. UE 114 may be a smart phone, a wearable device, an Internet of Things (IoT) device, and a tablet, etc.

EPS and 5GS networks are packet-switched (PS) Internet Protocol (IP) networks. This means that the networks deliver all data traffic in IP packets, and provide users with Always-On IP Connectivity. When UE joins an EPS/5GS network, a Packet Data Network (PDN) address (i.e., the one that can be used on the PDN) is assigned to the UE for its connection to the PDN. EPS calls the UE's "IP access connection" an evolved packet system (EPS) bearer, which is a connection between the UE and the P-GW. The P-GW is the default gateway for the UE's IP access. EPS has defined a Default EPS Bearer to provide the IP Connectivity that is Always-On.

In 5G, PDU session establishment is a parallel procedure of PDN connection procedure in 4G. A PDU session defines the association between the UE and the data network that provides a PDU connectivity service. Each PDU session is identified by a PDU session ID, and may include multiple QoS flows and QoS rules. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow. Within a PDU session, there should be one and only one default QoS rule.

In the current 5G non-access stratum (NAS) specification, based on QoS rule operation codes defined in the QoS rule IE, the allowed many different QoS rule operations including create, modify, and delete QoS rule and packet filters via PDU session establishment and modification procedures. In accordance with one novel aspect, UE behavior and error handling are defined for QoS rule operations via PDU session establishment and modification procedures. The default QoS rule indication (DQR) and the QoS flow identifier (QFI) of a signaled QoS rule should not be changed. The UE should check the QoS rule configuration provided in the PDU session modification command message for different types of QoS rule errors. Two new 5G session management (5GSM) causes are defined for QoS rule errors: a semantic error in the QoS operation (cause #83) and a syntactic error (cause #84) in the QoS operation. In the example of FIG. 1, UE 114 establishes a PDU session and performs a QoS operation via a PDU session modification procedure with the network over non-access stratum (NAS) layer signaling 130. Upon receiving the QoS rule configuration, UE 114 performs QoS rule management as depicted by 140. In one example, UE 114 rejects a PDU session modification command or releases the PDU session upon detecting a semantic error of the QoS operation.

Figure 2:
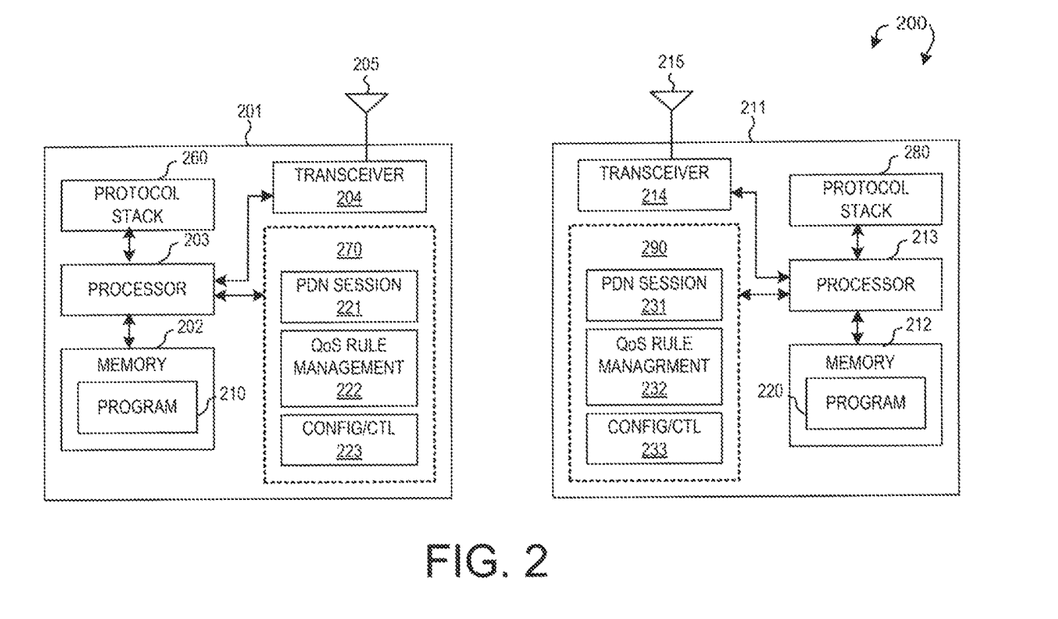
FIG. 2 illustrates simplified block diagrams of a user equipment (UE) in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. PDU session handling circuit 231 handles PDU session establishment and modification procedures. QoS flow and rule management circuit 232 creates, modifies, and deletes QoS flows and QoS rules for UE. Configuration and control circuit 233 provides different parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session handling circuit 221 that performs PDU session establishment and modification procedures with the network, a QoS rule management circuit 222 that determines any conflict of the default QoS rules and handles QoS rule management by detecting semantic error and syntactical error, a config and control circuit 223 that handles configuration and control parameters.

A command message from the network carries QoS configuration and operation for a new QoS rule (for creating new QoS rule) or QoS rule parameters and/or packet filter parameters (for modifying existing QoS rule). When the QoS operation carried by the command message is "Modify existing QoS rule and delete packet filters", then it is defined as a semantic error in the QoS operation if all the packet filters (PFs) of the existing QoS rule are deleted, and the existing QoS rule is a QoS rule of a PDU session of IPv4, IPv6, IPv4v6, or Ethernet PDU session type. This is because for those PDU session types, the QoS rule should not have an empty packet filter list. The QoS operation can be received via a PDU session modification procedure (via PDU session modification command message) or an EPS session management (ESM) procedure (via EPS bearer context request message).

Figure 3:
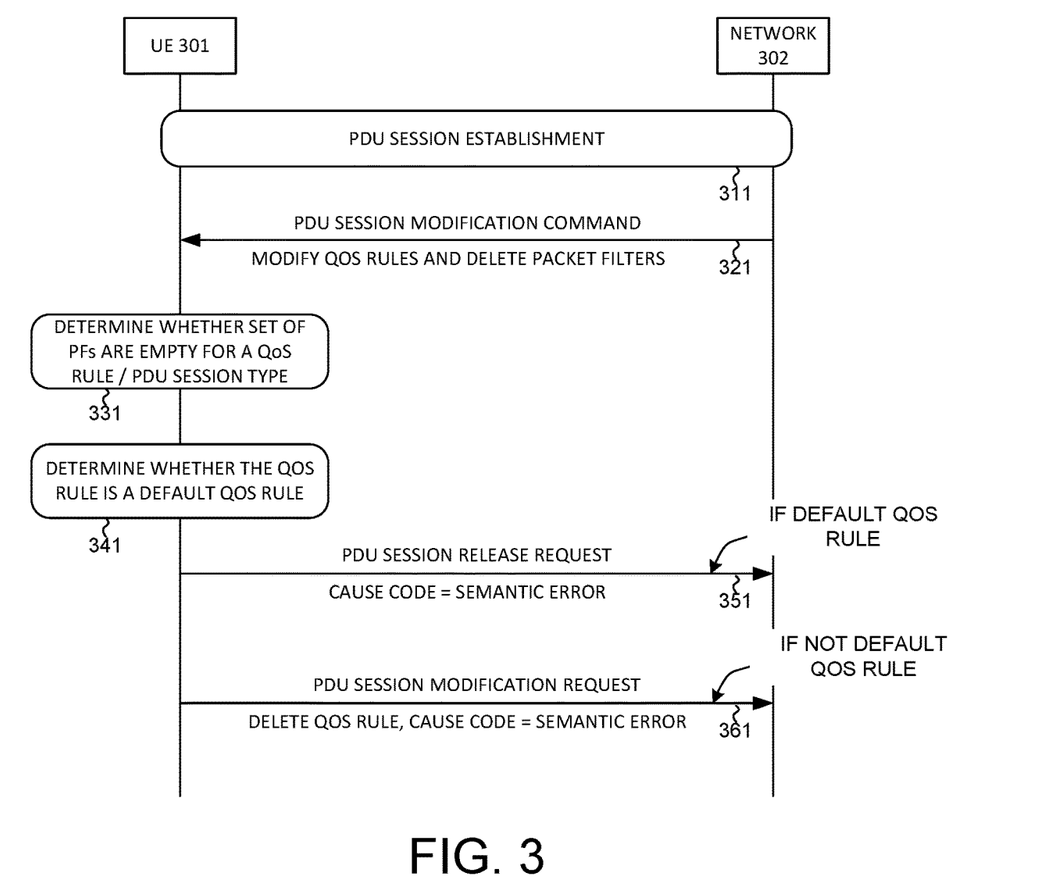
FIG. 3 illustrates one embodiment of QoS rule operation with semantic error for PDU session modification procedure in accordance with one novel aspect.

FIG. 3 illustrates one embodiment of QoS rule operation with semantic error for PDU session modification procedure in accordance with one novel aspect. In step 311, UE 301 and network 302 establish a PDU session via a PDU session establishment procedure. The PDU session may be established to comprise one or more QoS rules, including one default QoS rule. In step 321, network 302 sends a PDU session modification command message to UE 301. The command message is for UE to perform certain QoS operations for the PDU session, for example, to modify an existing QoS rule and delete packet filters. In step 331, UE 302 determines whether the QoS operation would result in the to-be-modified QoS rule to have empty packet filter list. In addition, UE 302 also determines whether the PDU session has a type of IPv4, IPv6, IPv4v6 or Ethernet PDU session type. If so, then a semantic error occurs, because for those PDU session type, the QoS rule should not have an empty packet filter list. In step 341, UE 301 further detects whether the to-be-modified QoS rule is default QoS rule or not.

If the detecting result in step 341 is positive, that means the existing QoS rule is a default QoS rule, then such semantic error causes problem with the default QoS rule of the PDU session. As a result, the PDU session should be released. In step 351, UE 301 initiates a PDU session release procedure by sending a PDU session release request message to network 302. The request message carries a 5GSM cause value #83 indicating "semantic error in the QoS operation". If the detecting result is negative in step 341, that means the existing QoS rule is not a default QoS rule, then UE shall not diagnose an error and process the QoS operation. In step 361, UE 301 processes the QoS operation. If the QoS operation was processed successfully, then UE 301 deletes the existing QoS rule having an empty packet filter list by sending a PDU session modification request message to network 302. The request message carries a 5GSM cause value #83 indicating "semantic error in the QoS operation". On the other hand, if the QoS operation was processed unsuccessfully, rather than deleting the existing QoS rule, UE 301 rejects the PDU session modification command message, which includes the 5GSM cause value #83 indicating "semantic error in the QoS operation".

Figure 4:
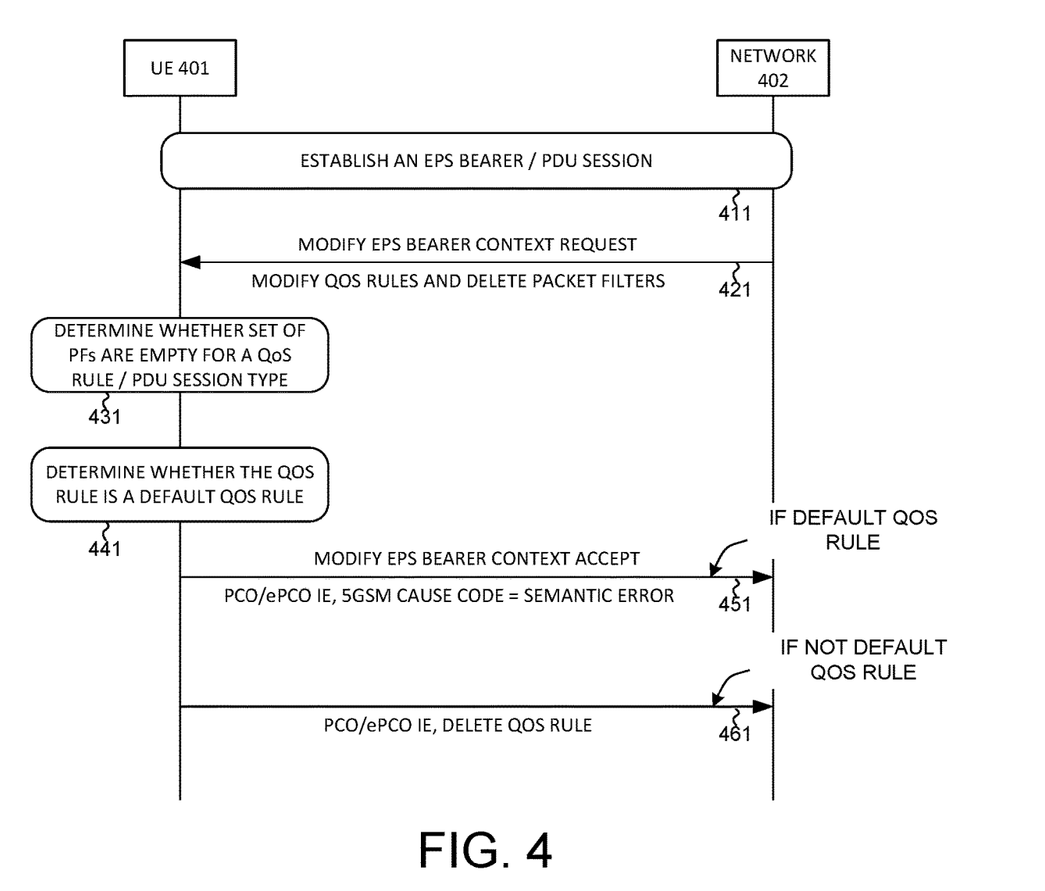
FIG. 4 illustrates one embodiment of QoS rule operation with semantic error for EPS session management procedure in accordance with one novel aspect.

FIG. 4 illustrates one embodiment of QoS rule operation with semantic error for EPS session management (ESM) procedure in accordance with one novel aspect. In step 411, UE 401 and network 402 establish an PDN connection which is associated with a PDU session. The PDU session may comprise one or more QoS rules, including one default QoS rule. In step 421, network 402 sends a modify EPS bearer context request message to UE 401. The request message includes a protocol configuration options IE or an extended protocol configuration options IE (PCO/ePCO IE) for UE to perform certain QoS operations for the PDU session, for example, to modify an existing QoS rule and delete packet filters. In step 431, UE 402 determines whether the QoS operation would result in the to-be-modified QoS rule to have empty packet filter list. In addition, UE 402 also determines whether the PDU session has a type of IPv4, IPv6, IPv4v6 or Ethernet PDU session type. If so, then a semantic error occurs, because for those PDU session type, the QoS rule should not have an empty packet filter list. In step 441, UE 401 further detects whether the to-be-modified QoS rule is default QoS rule.

If the detecting result in step 441 is positive, that means the existing QoS rule is a default QoS rule. In step 451, UE 401 sends a modify EPS bearer context accept message to network 402. But the accept message includes a protocol configuration options IE or an extended protocol configuration options IE (PCO/ePCO IE) that carries a 5GSM cause value #83 indicating "semantic error in the QoS operation". If the detecting result is negative in step 441, that means the existing QoS rule is not a default QoS rule, then UE shall not diagnose an error and process the QoS operation. In step 461, UE 401 deletes the existing QoS rule having an empty packet filter list by sending a QoS rule operation included in a protocol configuration options IE or an extended protocol configuration options IE (PCO/ePCO IE) to network 402.

Figure 5:
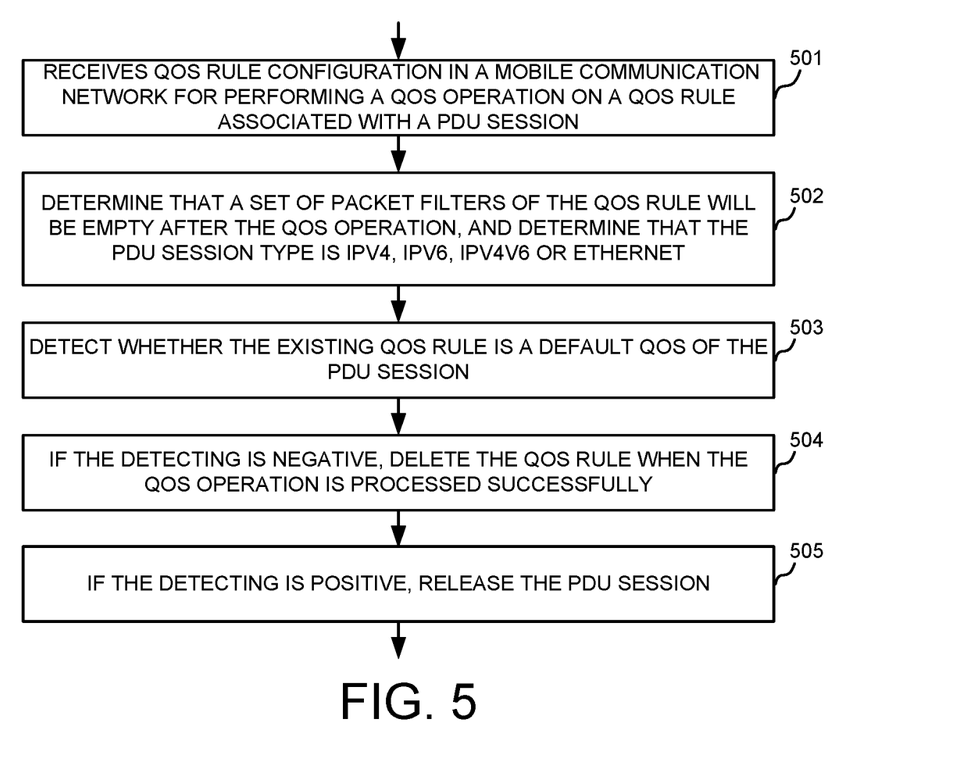
FIG. 5 is a flow chart of a method of QoS rule management handling semantic error in accordance with one novel aspect.

FIG. 5 is a flow chart of a method of QoS rule management handling semantic error in accordance with one novel aspect. In step 501, a UE receives Quality of Service (QoS) rule configuration in a mobile communication network for performing a QoS operation on a QoS rule associated with a protocol data unit (PDU) session. In step 502, the UE determines that a set of packet filters for the QoS rule will be empty after the QoS operation, and the PDU session type is IPv4, IPv6, IPv4v6, or Ethernet. In step 503, the UE detects whether the QoS rule is a default QoS rule of the PDU session. In step 504, if a detecting result is negative, then the UE deletes the QoS rule when the QoS operation is processed successfully. In step 505, if the detecting result is positive, then the UE releases the PDU session.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving Quality of Service (QoS) rule configuration by a user equipment (UE) in a mobile communication network for performing a QoS operation on a QoS rule associated with a protocol data unit (PDU) session;
   determining an error of the QoS operation as a result of determining that a set of packet filters of the QoS rule is empty after the QoS operation, and determining that the PDU session type is IPv4, IPv6, IPv4v6 or Ethernet;
   detecting whether the QoS rule is a default QoS rule of the PDU session;
   if a detecting result is negative, deleting the QoS rule and indicating the error of the QoS operation to the network; and
   if the detecting result is positive, releasing the PDU session and indicating the error of the QoS operation to the network.

2. The method of claim 1, wherein the QoS rule configuration is received via a PDU session modification command message for the UE to perform the QoS operation.

3. The method of claim 2, further comprises:
   if the detecting result is negative, rejecting the PDU session modification command message with a 5G session management (5GSM) cause value indicating the error of the QoS operation when the QoS operation is not processed successfully.

4. The method of claim 2, wherein the QoS operation is for the UE to "modify existing QoS rule and delete packet filters".

5. The method of claim 1, wherein the deleting the QoS rule involves the UE sending a PDU session modification request message.

6. The method of claim 5, wherein the PDU session modification request message carries a 5G session management (5GSM) cause value indicating the error of the QoS operation.

7. The method of claim 1, wherein the releasing the PDU session involves the UE sending a PDU session release request message.

8. The method of claim 7, wherein the PDU session release request message carries a 5G session management (5GSM) a cause value indicating the error of the QoS operation.

9. The method of claim 1, wherein the QoS rule configuration is received via a modify EPS bearer context request message for the UE to perform the QoS operation.

10. The method of claim 9, further comprising:
    transmitting a modify EPS bearer context accept message upon detecting the QoS rule is the default QoS rule, wherein the accept message carries a 5G session management (5GSM) cause value indicating the error of the QoS operation.

11. A User Equipment (UE), comprising:
    a receiver that receives Quality of Service (QoS) rule configuration in a mobile communication network, wherein the QoS rule configuration is for the UE to perform a QoS operation on a QoS rule associated with a protocol data unit (PDU) session;
    a control circuit that determines an error of the QoS operation as a result of determining that a set of packet filters of the QoS rule is empty after the QoS operation and detects whether the QoS rule is a default QoS rule of the PDU session, and the PDU session type is IPv4, IPv6, IPv4v6 or Ethernet;
    a QoS management circuit that deletes the QoS rule if the QoS rule is not the default QoS rule of the PDU session and indicates the error of the QoS operation to the network; and
    a PDU session handling circuit that releases the PDU session if the QoS rule is the default QoS rule of the PDU session and indicates the error of the QoS operation to the network.

12. The UE of claim 11, wherein the QoS rule configuration is received via a PDU session modification command message for the UE to perform the QoS operation.

13. The UE of claim 12, wherein the QoS rule is not the default QoS rule, and wherein the UE rejects the PDU session modification command message with a 5G session management (5GSM) cause value indicating the error of the QoS operation when the QoS operation is not processed successfully.

14. The UE of claim 12, wherein the QoS operation is for the UE to "modify existing QoS rule and delete packet filters".

15. The UE of claim 11, wherein the deleting the QoS rule involves the UE sending a PDU session modification request message.

16. The UE of claim 15, wherein the PDU session modification request message carries a 5G session management (5GSM) cause value indicating the error of the QoS operation.

17. The UE of claim 11, wherein the releasing the PDU session involves the UE sending a PDU session release request message.

18. The UE of claim 17, wherein the PDU session release request message carries a 5G session management (5GSM) cause value indicating the error of the QoS operation.

19. The UE of claim 11, wherein the QoS rule configuration is received via a modify EPS bearer context request message for the UE to perform the QoS operation.

20. The UE of claim 19, further comprising:
    a transmitter that transmits a modify EPS bearer context accept message upon detecting the QoS rule is the default QoS rule, wherein the accept message carries a 5G session management (5GSM) cause value indicating the error of the QoS operation.

* * * * *